US011120038B1

(12) United States Patent
Ossher et al.

(10) Patent No.: US 11,120,038 B1
(45) Date of Patent: Sep. 14, 2021

(54) SYSTEMS AND METHODS FOR CREATING A DATA LAYER BASED ON CONTENT FROM DATA SOURCES

(71) Applicant: Palantir Technologies Inc., Palo Alto, CA (US)

(72) Inventors: Joel Ossher, Oakton, VA (US); Adam Campbell, Ithaca, NY (US); Ashley Einspahr, Brooklyn, NY (US); Stephen Yazicioglu, New York, NY (US); Lindsay Ward, Alexandria, VA (US); Eric Anderson, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/681,473

(22) Filed: Nov. 12, 2019

Related U.S. Application Data

(60) Provisional application No. 62/893,099, filed on Aug. 28, 2019.

(51) Int. Cl.
*G06F 16/00* (2019.01)
*G06F 16/26* (2019.01)
*G06F 16/21* (2019.01)
*G06F 16/25* (2019.01)
*G06F 16/22* (2019.01)

(52) U.S. Cl.
CPC ........... *G06F 16/26* (2019.01); *G06F 16/212* (2019.01); *G06F 16/2246* (2019.01); *G06F 16/252* (2019.01)

(58) Field of Classification Search
CPC .... G06F 16/20; G06F 16/783; G06F 16/9027; G06F 16/185; G06F 16/22; G06F 16/2246; G06F 16/2264; G06F 16/367; G06F 16/2291; G06F 16/51; G06F 16/31
See application file for complete search history.

(56) References Cited

U.S. PATENT DOCUMENTS

2017/0199875 A1* 7/2017 Nevrekar ............ G06F 16/9032
2020/0381092 A1* 12/2020 Granvold ............... G16H 40/63

* cited by examiner

*Primary Examiner* — Cheryl Lewis
(74) *Attorney, Agent, or Firm* — Sheppard Mullin Richter & Hampton LLP

(57) ABSTRACT

Systems, methods, and non-transitory computer-readable media can obtain data form one or more data sources. The data from the one or more data sources can be processed into one or more data records. Each data record can include at least an identification, a data type, and data to be stored. The data records can be organized into a tree data structure. The tree data structure can be stored as an intermediate data layer in a data analysis platform.

17 Claims, 7 Drawing Sheets

SYSTEMS AND METHODS FOR CREATING A DATA LAYER BASED ON CONTENT FROM DATA SOURCES

CROSS REFERENCE TO RELATED APPLICATIONS

This application claims the benefit under 35 U.S.C. § 119(e) of U.S. Provisional Application No. 62/893,099, filed Aug. 28, 2019, the content of which is incorporated by reference in its entirety into the present disclosure.

FIELD OF THE INVENTION

This disclosure relates to approaches for creating a data layer. In particular, this disclosure relates to creating a data layer that can, for example, be accessed to provide provenance information.

BACKGROUND

Under conventional approaches, when accuracy or trustworthiness of data integrity arises, a static version of data (e.g., a PDF version) may be accessed by users through a computing system. However, the static version of the data lacks interactivity or intuitiveness that allows users to quickly identify correspondence between the static version of the data and data in data sources from which the static version of the data originated from. As such, conventional approaches may not accurately provide provenance information and/or may be cumbersome, inefficient, and degrade user experience.

SUMMARY

Various embodiments of the present disclosure can include systems, methods, and non-transitory computer-readable media configured to obtain data form one or more data sources. The data from the one or more data sources can be processed into one or more data records (e.g., JSON objects). Each data record can include at least an identification, a data type, and data to be stored. The data records can be organized into a tree data structure (e.g., a JSON object tree). The tree data structure can be stored as an intermediate data layer in a data analysis platform.

In some embodiments, the data from the one or more data sources can comprise content and metadata information of the one or more data sources. The metadata information can be associated with the content.

In some embodiments, the content can comprise at least words associated with data entries of the one or more data sources.

In some embodiments, the metadata information can include at least one of a date a data entry was last edited, a number of edits to the data entry, or an URL address of the data entry.

In some embodiments, one or more data analysis objects can be generated for utilization in the data analysis platform based on data stored in the intermediate data layer. The one or more data analysis objects can be manipulated in the data analysis platform. One or more relationships can be determined between the one or more data analysis objects.

In some embodiments, a user indication can be received to access provenance information associated the one or more data analysis objects. A user interface can be generated, at runtime, to display at least the data from the one or more data sources alongside the one or more data analysis objects.

In some embodiments, the content and the metadata information can be recreated from data stored in the intermediate data layer. The metadata information to be displayed on the user interface can be customized. The content and the customized metadata information can be displayed on the user interface.

In some embodiments, upon a user interaction, in the user interface, a correspondence can be indicated between the data from the one or more data sources and a data analysis object of the one or more data analysis objects.

In some embodiments, the identification of each data record can be generated using a function.

In some embodiments, the function can be implemented as a hash function plus a user provided value.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
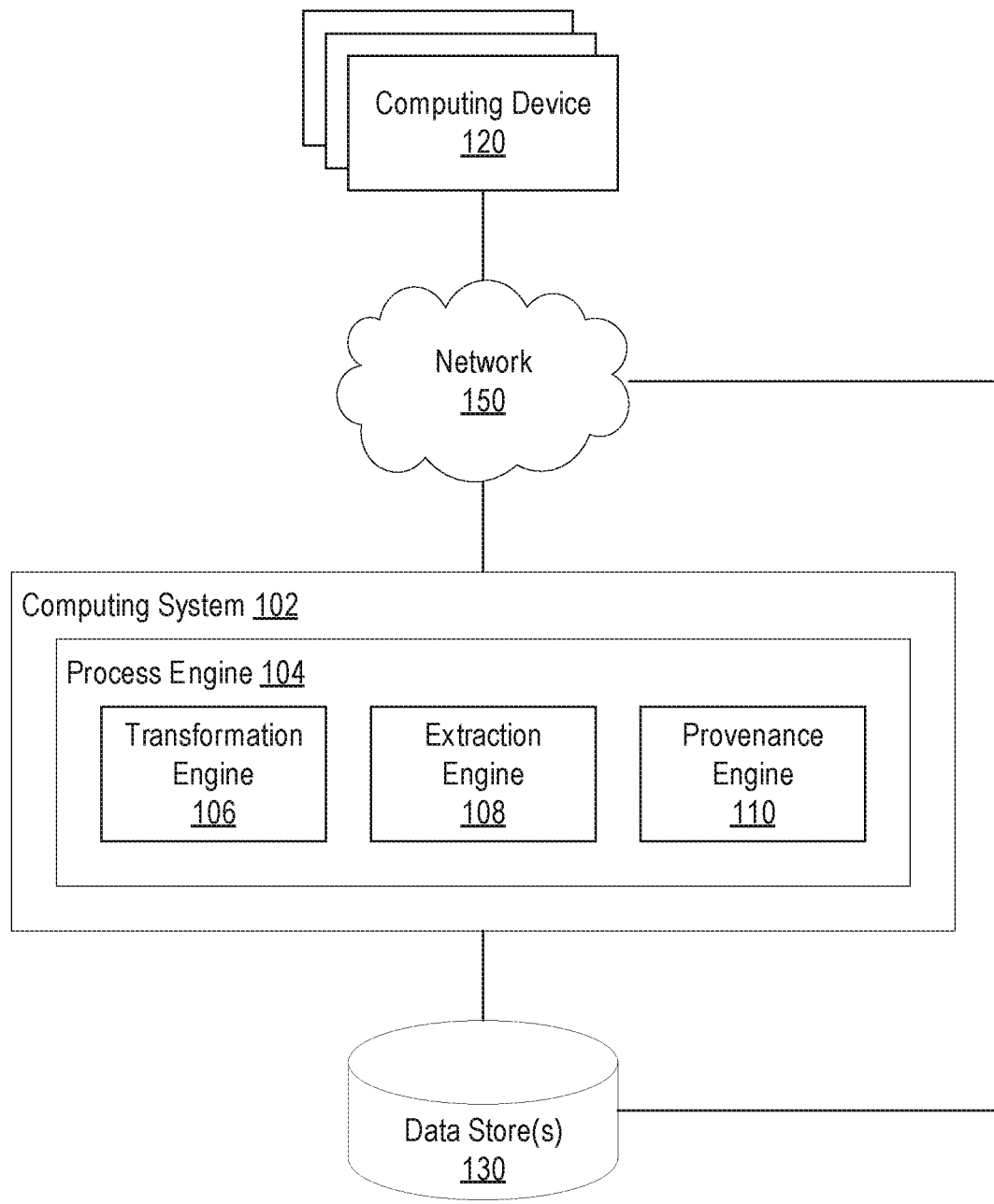
FIG. 1 illustrates an example environment for creating an intermediate data layer, in accordance with various embodiments of the present disclosure.

Under conventional approaches, when accuracy or trustworthiness of data integrity arises, a static version of data (e.g., a PDF version) may be accessed by users through a computing system. However, the static version of the data lacks interactivity or intuitiveness that allows users to quickly identify correspondence between the static version of the data and data in data sources from which the static version of the data originated from. As such, conventional approaches may not accurately provide provenance information and/or may be cumbersome, inefficient, and degrade user experience.

A claimed solution rooted in computer technology overcomes problems specifically arising in the realm of computer technology. In various embodiments, a computing system can obtain data from a data source (e.g., a remote data source, an external data source, a third-party data source, etc.). Although a data source is discussed here, it will be appreciated that data may be obtained from one or more such data sources (e.g., a plurality of remote federated data sources). The data from the data source comprises content (e.g., words, strings, images, audio, video, alphanumeric characters, etc.) and metadata information (e.g., timestamp information, user identifiers, content identifiers, system identifiers, etc.) associated with the content. The content and the metadata information can be processed (e.g., transformed) as data records. Such data records can be implemented as JavaScript Object Notation (JSON) objects. In some embodiments, the data records can be arranged or organized into a tree data structure. For example, JSON objects can be arranged in a JSON tree. The tree data structure can be stored in the computing system as an intermediate data layer record (or, simply, an "intermediate data layer") between the data source and a data analysis platform running on the computing system. When accuracy or trustworthiness of data integrity arises, the computing system can be instructed to reconstruct or recreate the content and the metadata information from data stored in the intermediate data layer. In some embodiments, each data record can be associated with an identification code. The identification code is a unique code that is stable (e.g., not subject to changes) even though the underlying data from which the data record was based, changes.

Users can use the data analysis platform to perform various analysis on data from a data source to gain various insights in the data. For example, a newspaper article (e.g., data from a data source) can be analyzed by the data analysis platform to determine various relationships between subjects (e.g., people, ideas, themes, things, etc.) described in the newspaper article. In some embodiments, one or more data analysis objects can be utilized for processing and manipulating in the data analysis platform by users. Processing and manipulating of data analysis objects allow users to gain various insights (e.g., relational information, context information, etc.) between the data analysis objects. The one or more data analysis objects can be generated based on data models using data stored in the intermediate data layer. For example, a newspaper article from a website can be stored in the immediate data layer as data records arranged in a tree data structure. In this example, data analysis objects can be generated from the intermediate data layer. For instance, a data analysis object can be generated for each subject described in the newspaper article. In some embodiments, while manipulating data analysis objects, if accuracy or trustworthiness of data integrity arises, users can reproduce, in a user interface (e.g., graphical user interface), within the data analysis platform, content and metadata information of data obtained from the data source (e.g., "raw" data) from which the data analysis objects were extracted through the intermediate data layer. In this user interface, the users can view provenance information relating to the data analysis objects. In some embodiments, users can customize provenance information displayed in the user interface. For example, users can select which metadata information to be displayed in the user interface. In some embodiments, users can interact with the user interface to find correspondence between data analysis objects and data from a data source. The intermediate data layer, and/or the other features described herein, may allow the computing system to accurately and/or efficiently (e.g., in terms of computing resource) provide provenance information, and provide an improved user experience. These and other embodiments will be discussed in further detail herein.

FIG. 1 illustrates an example computing environment 100 for creating an intermediate data layer, in accordance with various embodiments of the present disclosure. The example environment 100 may include at least one computing system 102 that includes one or more processors and memory. The processors may be configured to perform various operations by interpreting machine-readable instructions. In some embodiments, the example environment 100 may be implemented as a data analysis platform. In some embodiments, the example environment 100 may be configured to interact with computing systems of the data analysis platform. In various embodiments, computing systems of the data analysis platform may obtain data from a data source, process or transform the data into one or more data records, arrange the one or more data records into a tree data structure to be stored in an intermediate data layer, generate one or more data analysis objects from the intermediate data layer, and perform various manipulations on the one or more data analysis objects.

In some embodiments, the computing system 102 may include a process engine 104. The process engine 104 may include a transformation engine 106, an extraction engine 108, and provenance engine 110. The process engine 104 may be executed by the processor(s) of the computing system 102 to perform various operations including those operations described in reference to the transformation engine 106, the extraction engine 108, and the provenance engine 110. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the transformation engine 106, the extraction engine 108, and the provenance engine 110 may be implemented in one or more computing systems and/or devices. The environment 100 may also include one or more data stores 130 accessible to the computing system 102. The data stores 130 may be accessible to the computing system 102 either directly or over a network 150. In some embodiments, the data stores 130 may store data that may be accessed by the process engine 104 to provide the various features described herein. In some instances, the data stores 130 may include federated data stores, databases, or any other type of data source from which data may be stored and retrieved, for example. In some implementations, data stores 130 may include various types of data sets on which determinations of accuracy or consistency with other information can be made. In general, a user operating a computing device 120 can interact with the computing system 102 over the network 150, for example, through one or more graphical user interfaces and/or application programming interfaces.

The transformation engine 106 can be configured to obtain data (e.g. "raw" data) from a data source. The data from the data source can comprise content (e.g., words, strings, images, audio, video, alphanumeric characters, etc.) and metadata information (e.g., timestamp information, user identifiers, content identifiers, system identifiers, etc.) associated with the content. For example, in some embodiments, a data source can be a web-based encyclopedia (e.g., Wikipedia) and data of the encyclopedia can include content of the encyclopedia and metadata information associated with the content. In this example, the content of the encyclopedia can include encyclopedia entries (e.g., pages, web pages, etc.) and words associated with each encyclopedia entry. In this example, the metadata information can include any metadata associated with the encyclopedia entries. For instance, metadata information may include a date an encyclopedia entry was last edited and/or a user identifier of user who last edited the encyclopedia entry. In some embodiments, the transformation engine 106 can process or transform content and metadata information as data records. For example, encyclopedia entries and metadata information associated with the encyclopedia entries can be transformed as JavaScript Object Notation (JSON) objects. In some embodiments, the data records may include the raw data. Accordingly, when the data record is accessed, it may return raw data instead of only processed data.

In some embodiments, the transformation engine 106 can arrange or organize data records to a tree data structure (e.g., a JSON tree) with a root node represented by a data record and one or more intermediate nodes represented by other data records, the other data records related to the data record. For example, an encyclopedia entry about a movie can be processed as one or more data records and these data records can be arranged or organized into a tree data structure associated with the encyclopedia entry. In this example, a data record describing the movie can be stored as a root node of the tree data structure, while other data records describing movie actors, production members, and/or the like, and can be stored as intermediate nodes of the tree data structure.

In some embodiments, metadata information associated with content can also be stored as intermediate nodes. For example, metadata information such as a date an encyclopedia entry was last edited can be stored as an intermediate node of a tree data structure. In various embodiments, the tree data structure can be stored in the data analysis platform as an intermediate data layer. This intermediate data layer is a data layer or interface (e.g., a programmable interface) within the data analysis platform that preserves content and metadata information of data from a data source such that when accuracy or trustworthiness of data integrity arises, the data from the data source can be recreated or reproduced in its original form such that users to access provenance information. The intermediate data layer is accessible to the data analysis platform to perform various operations. For example, the data analysis platform, through the extraction engine 108, can generate data analysis objects for utilization in the data analysis platform. The transformation engine 106 is discussed in greater detail with respect to FIG. 2.

The extraction engine 108 can be configured to generate one or more data analysis objects for utilization in the data analysis platform. The extraction engine 108 can generate the one or more data analysis objects based on data stored in the intermediate data layer. The extraction engine 108 can generate the one or more data analysis objects in accordance with one or more data models (e.g., object-based, or object-oriented, data model(s)). For example, content of an encyclopedia entry can be transformed as data records and the data records can be arranged into a tree data structure and stored in the intermediate data layer. In this example, the extraction engine 108 can extract words (e.g., content) in the encyclopedia entry and populate the words in accordance with a data model to generate a data analysis object based on the data model. In some embodiments, the data model can be user defined and can include a plurality of fields which can be populated with data stored in the intermediate data layer. For example, a data model can include a subject field and one or more attribute fields related to the subject field. In this example, the extraction engine 108 can extract data stored in the *intermedia* data layer and populate the data into the subject field and the one or more attributes fields as appropriate. For instance, the extraction engine 108 can extract words in an encyclopedia entry and populate the words to the subject field and other fields of a data analysis object. In various embodiments, data analysis objects generated by the extraction engine 108 can be further processed or manipulated in the data analysis platform to determine various relationships or other contextual information between the data analysis objects.

The provenance engine 110 can be configured to provide a user interface, such as a graphical user interface, through which users can access provenance information associated with data analysis objects. The user interface can be accessed by the users, upon a selection, through the data analysis platform. The user interface can recreate and display data from a data source in its original form. The user interface can recreate the data based on data stored in the intermediate data layer. In some embodiments, the user interface can be rendered at runtime such that any changes to the intermediate data layer are instantly reflected to the users accessing the provenance information. In some embodiments, the user interface can be divided into types in accordance with data sources. For example, a user interface to recreate and display data from a web-based encyclopedia may be different from a user interface to recreate and display data from an online movie database. In some embodiments, the user interface may be customizable. For example, a user can select types of data to be displayed in the user interface. For instance, the user can select to view, in the user interface, content of an encyclopedia entry but not its metadata information. As another example, the user can select types of metadata information to be displayed in the user interface. For instance, the user can select to include only metadata information on when an encyclopedia entry was last edited. Many variations are possible.

In some embodiments, the provenance engine 110 can display, in the user interface, data analysis objects alongside the recreated data from which the data analysis objects were generated. The provenance engine 110 can provide users with interactivity such that the users can intuitively visualize correspondence between the data analysis objects and the recreated data. For example, in the user interface, if a user directs a cursor (e.g., a pointer, an arrow, etc.) to a field (e.g., a subject field, an attribute field, etc.) of a data analysis object, the provenance engine 110 can highlight, bold, underline, italicize, or otherwise indicate portions in the recreated data (e.g., word or words) that correspond to the field of the data analysis object directed by the cursor. In this example, the user can quickly identify and view provenance information associated with the data analysis object. The provenance engine 110 is discussed in greater detail with respect to FIG. 3B.

Figure 2:
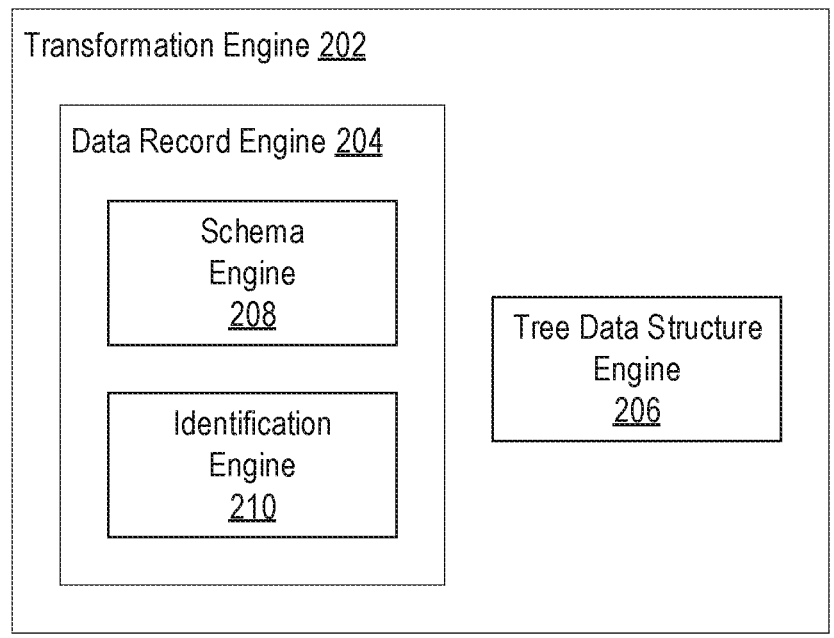
FIG. 2 illustrates a transformation engine, in accordance with various embodiments of the present disclosure.

FIG. 2 illustrates a transformation engine 202, in accordance with various embodiments of the present disclosure. In some embodiments, the transformation engine 106 of FIG. 1 can be implemented as the transformation engine 202. As shown in FIG. 2, the transformation engine 202 can include a data record engine 204 and a tree data structure engine 206. The data record engine 204 can include a schema engine 208 and an identification engine 210.

As discussed, the transformation engine 202 can be configured to obtain data from a data source. The data from the data source can comprise content (e.g., words, strings, images, audio, video, alphanumeric characters, etc.) and metadata information (e.g., timestamp information, user identifiers, content identifiers, system identifiers, etc.) associated with the content. In some embodiments, the data record engine 204 can be configured to process or transform the content and the metadata information as data records. Each data record may be associated with a schema and the data record engine 204 may utilize the schema engine 208 to define a schema for a data record through which the data from the data source is organized. In some embodiments, to organize the data, the data record engine 204 can parse content (e.g., words) of the data and associate the parsed content with each defined schema.

In some embodiments, the schema engine 208 (e.g., upon receiving instructions from users) can define a schema for a data record. The schema, in some embodiments, can include at least an identification code, a data type (e.g., a string, an array, relational or tabular data, etc.), and data to be stored. For example, a schema for a JSON object can be defined to include an identification key, a data type key, and a data key. As an illustrative example, using the schema defined, a data record for a movie can be created based on an encyclopedia entry about the movie. In this example, an identification code for the data record can be assigned and stored in the data record. This identification code is unique and is not subject to changes. The identification code is discussed in greater detail below. In this example, the data record stores two types of data: movie title and cast members in the movie. A first data type can be a string because the movie title is a string (e.g., words). A second data type can be an array because cast members can be arranged in an array of names. The data to be stored is any words that reflect the movie's title or cast members in the encyclopedia entry. For instance, if the encyclopedia entry includes the sentence "John Doe and Jane Doe are two main actors for the movie ABC," the words "ABC" can be identified and stored, in the example data record, as the data corresponding to the first data type (e.g., string). The words "John Doe" and "Jane Doe" can be identified and stored, in the example data record, as elements in an array corresponding to the second data type. In some embodiments, the schema engine 208 can define different schema for different data records. For example, a schema of a data record for movie cast members can be defined. In this example, in addition for an identification code, the schema engine 208 can define the schema to include an array to store, for example, gender, age, birthday, and birthplace of each cast member in the array. Many variations are possible.

The identification engine 210 can be configured to generate an identification code for a data record. In some embodiments, the identification code for the data record can include numbers. In some embodiments, the identification code for the data record can include alphabets. In some embodiments, the identification code for the data record can include some combinations of alphabets and numbers (e.g., alphanumeric). Many variations are possible. Each identification code assigned to a data record is unique and stable (e.g., not changing). For example, an identification code can be assigned to a data record describing a movie cast member based on an encyclopedia entry. In this example, the encyclopedia entry is subject to edits. However, as long as the edits do not alter information relating to the movie cast member, the identification code assigned to the data record would likely not change or stable. In some embodiments, the identification engine 210 can generate an identification code for a data record using a function. The function can be implemented with a hash function plus a user provided value (a number). A hash value can be outputted from the function. This hash value can be used as the identification for the data record. The identification engine 210 is discussed in greater detail with respect to FIG. 3C.

The tree data structure engine 206 can be configured to arrange data records into a tree data structure and store the tree data structure in a data analysis platform as an intermediate data layer. For example, the tree data structure can be implemented as a JSON tree. The JSON tree can be stored in the intermediate data layer. Once data records are generated, the tree data structure engine 206 can arrange or organize the data records as a tree data structure. A tree data structure can comprise a root node (e.g., a root data record) and one or more intermediate nodes (e.g., intermediate data records). For example, continuing from the example of the encyclopedia entry of the movie above, a plurality of data records can be created. For instance, a first data record associated with the movie can generated by populating words in the encyclopedia entry relating to the movie in accordance with a first schema (e.g., the schema for the data record for the movie), a second data record for a movie cast member can be generated by populating words in the encyclopedia entry relating to the movie actor in accordance with a second schema (e.g., the schema for the data record for the movie cast members), and a third data record for another movie cast member can be generated by populating words in the encyclopedia entry relating to the another movie actor in accordance with the second schema. In this example, the tree data structure engine 206 can arrange the data records into a tree data structure such that the first data record is the root node and the second and the third data records are the intermediate nodes branching off from the root node.

Figure 3A:
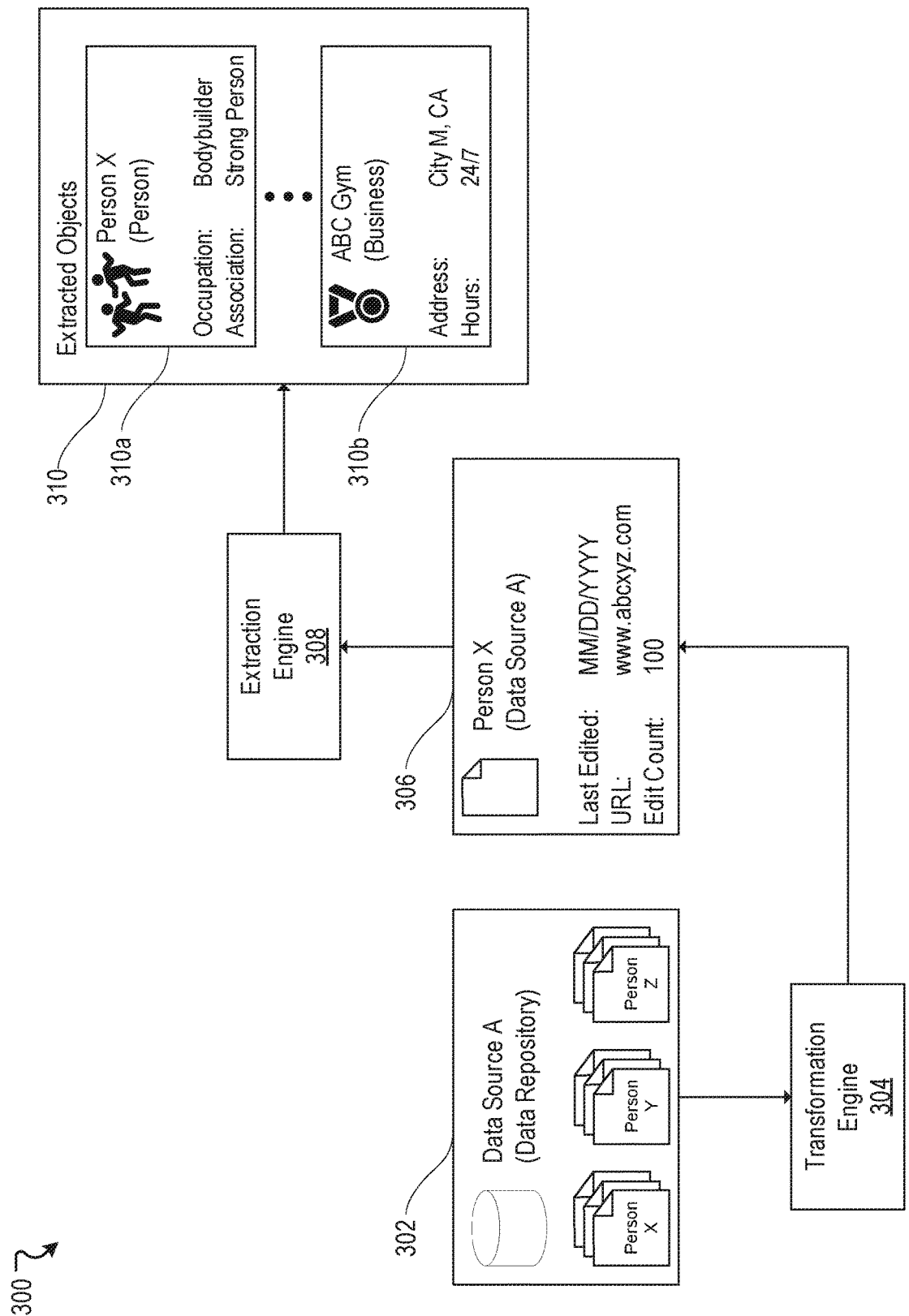
FIG. 3A illustrates an example functional diagram for generating data analysis objects for utilization in a data analysis platform, in accordance with various embodiments of the present disclosure.

FIG. 3A illustrates an example functional diagram 300 for generating data analysis objects for utilization in a data analysis platform, in accordance with various embodiments of the present disclosure. In the example diagram 300, there may be a data source 302 accessible to a transformation engine 304. In various embodiments, the transformation engine 304 can be implemented with the transformation engine 106 of FIG. 1. In some embodiments, the data source 302 may be accessible to the transformation engine 304 over a network (e.g., the network 106 of FIG. 1). As depicted in FIG. 3A, the data source 302 is a crowd-source database (e.g., a Wikipedia), wherein users of the database can create and/or edit one or more data entries (e.g., Wikipedia entries) in the database. For example, a user can create a data entry or modify an existing data entry in the database. The transformation engine 304 can obtain data from the data source 302. The data from the data source 302 can comprise content (e.g., words, strings, images, audio, video, alphanumeric characters, etc.) of the data entries and metadata information (e.g., timestamp information, user identifiers, content identifiers, system identifiers, etc.) associated with the content of the data entries. The transformation engine 304 can process or transform the content and the metadata information as data records, arrange the data records into a tree data structure, and store the tree data structure in the data analysis platform as an intermediate data layer 306.

In FIG. 3A, the content and the metadata information of the data entries can be stored in the data analysis platform as the intermediate data layer 306. The intermediate data layer 306 can preserve various data associated with the data entries. For example, a data entry ("Person X") in the data source 302 is shown in FIG. 3A. In this example, the intermediate data layer 306 can preserve title information (e.g., "Person X") of the data entry, content (e.g., words) of the data entry (see FIG. 3B), and metadata information (e.g., "Last Edited," "URL," and "Edit Count") of the data entry. In some embodiments, the functional diagram 300 further includes an extraction engine 308. The extraction engine 308 can be configured to generate one or more data analysis objects 310 from the intermediate data layer 306 in accordance with one or more data models. In FIG. 3A, two data models are present—a data model for a person and a data model for a business entity. Based on the two data models, the extraction engine 308 can generate a data analysis object 310a corresponding to the data model for the person and a data analysis object 310b corresponding to the data model for the business entity. The data analysis object 310a includes a subject field and two attribute fields "Occupation" and "Association." The subject field of the data analysis object 310a is populated with the words "Person X" from the intermediate data layer 306. The "Occupation" attribute field and the "Association" attribute field of the data analysis object 310a are populated with the word "Bodybuilder" and the words "Strong Person" from the intermediate data layer 306 (see FIG. 3B). The data analysis object 310b includes a subject field and two attribute fields "Address" and "Hours." The subject field of the data analysis object 310b is populated with the words "ABC Gym" from the intermediate data layer 306 (see FIG. 3B). The "Address" attribute field and the "Hours" attribute field of the data analysis object 310b are populated with the words "City M, CA" and the numbers "24/7" from the intermediate data layer 306 (see FIG. 3B). In various embodiments, the one or more data analysis objects 310 can be utilized in the data analysis platform. During the utilization of the one or more data analysis objects 310 in the data analysis platform, if accuracy or trustworthiness of data integrity arises, users can access the intermediate data layer 306, through the data analysis platform, to view provenance information relating to the one or more data analysis objects 310.

Figure 3B:
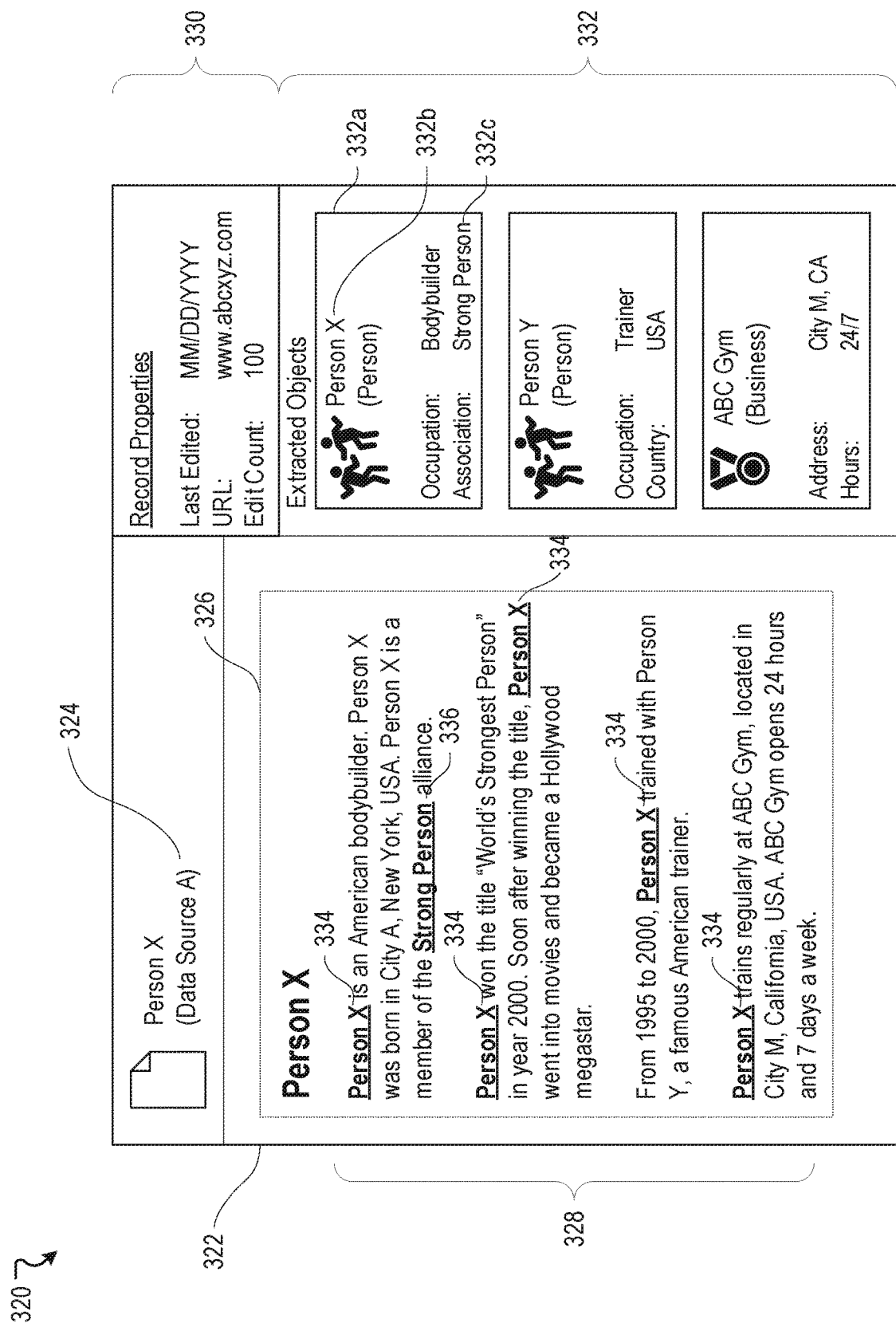
FIG. 3B illustrates an example user interface generated by a provenance engine, in accordance with various embodiments of the present disclosure.

FIG. 3B illustrates a user interface 320 generated by a provenance engine, in accordance with various embodiments of the present disclosure. The user interface 320 can be displayed on a screen 322 of a computing device accessing a data analysis platform. FIG. 3B depicts a scenario in which a user, while processing and manipulating one or more data analysis objects 332 (e.g., the one or more data analysis objects 310 of FIG. 3A) in the data analysis platform, becomes suspicious of the one or more data analysis objects 332. For example, the one or more data analysis objects 332 may display information that is questionable or is different from what the user is accustomed to seeing from a data entry 326 of a data source from which the one or more data analysis objects 332 were generated through an intermediate data layer of the data analysis platform. In this scenario, the user may access provenance information associated with the one or more data analysis objects 332. The user, upon a selection, may gain access to the user interface 320. The user interface 320 can be rendered at runtime and/or can recreate content 328 of the data entry 326 from the intermediate data layer of the data analysis platform. The user can view various provenance information associated with the one or more data analysis objects 332 through the user interface 320. For example, an identifier information 324 ("Data Source A") associated the data source, a title information ("Person X") associated with the data entry 326, and the content 328 (e.g., words) of the data entry 326 can be displayed in the user interface 320.

In some embodiments, the user interface 320 can further display metadata information 330 associated with the data entry 326. The metadata information 330 can include information relating to a date ("Last Edited") the data entry 326 was last edited, a web address ("URL") of the data entry 326, and a number of edits ("Edit Count") to the data entry 326, for example. In some embodiments, the metadata information 330 can be customized by the user. For example, the user can select to display only metadata information relating to the date the data entry 326 was last edited and the web address of the data entry 326 in the user interface 320.

In some embodiments, the user interface 320 can display the one or more data analysis objects 332 alongside the content 328 of the data entry 326. In such embodiments, the user can interact with the one or more data analysis objects 332, through the user interface 320, to identify provenance information relating to the one or more data analysis objects 332. For example, the user can move a cursor to a subject field 332b ("Person X") of a data analysis object 332a. The user interface 320, in response, can bold and underline or otherwise indicate words 334 in the content 328 of the data entry 326 that correspond to the subject field 332b. Similarly, if the user moves the cursor to an attribute field 332c ("Strong Person") of the data analysis object 332a, words 336 corresponding to the attribute field 332c can be bold and underlined or otherwise indicated by the user interface 320. Many variations are possible. For example, the user can move the cursor to other data analysis objects to view provenance information relating to the other data analysis objects.

Figure 3C:
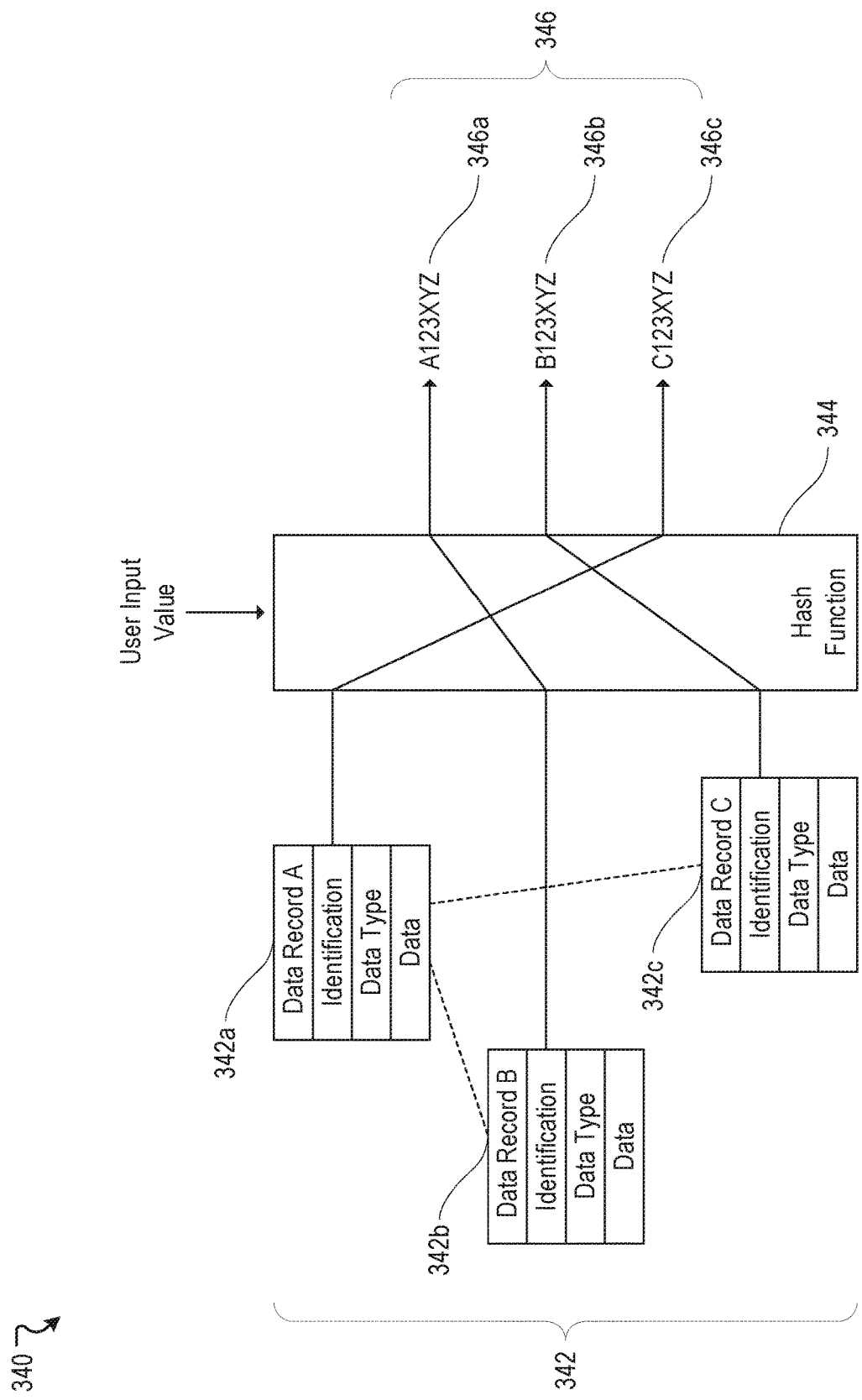
FIG. 3C illustrates a scheme for generating identification codes for data records, in accordance with various embodiments of the present disclosure.

FIG. 3C illustrates a scheme 340 for generating identification codes for data records, in accordance with various embodiments of the present disclosure. In various embodiments, one or more data records 324a, 342b, 342c, can be stored as a tree data structure 342 and the tree data structure 342 can be stored as an intermediate data layer in a data analysis platform. In FIG. 3C, a data record 342a is a root node of the tree data structure 342 and a data record 342b and a data record 342c are intermediate nodes of the tree data structure 342. Each data record can include an identification code. The identification code can be generated using a function 344. The function 344 can be implemented as a hash function plus a user provided value (number). Output of the function is a set of unique identification codes 346 that can be assigned to each data record. In FIG. 3C, an identification code 346a ("A123XYZ") is assigned to the data record 342b, an identification code 346b ("B123XYZ") is assigned to the data record 342c, and an identification code 346c ("C123XYZ") is assigned to the data record 342a. Because the identification codes 346 are generated by combining a user provided value with a hash function, each identification code (346a, 346b, and 346c) is stable over time. Even if underlying data entry from which data records (342a, 342b, and 342c) are based, changes, the identification codes 346 assigned to the data records (342a, 342b, and 342c) is unlikely to change.

Figure 4:
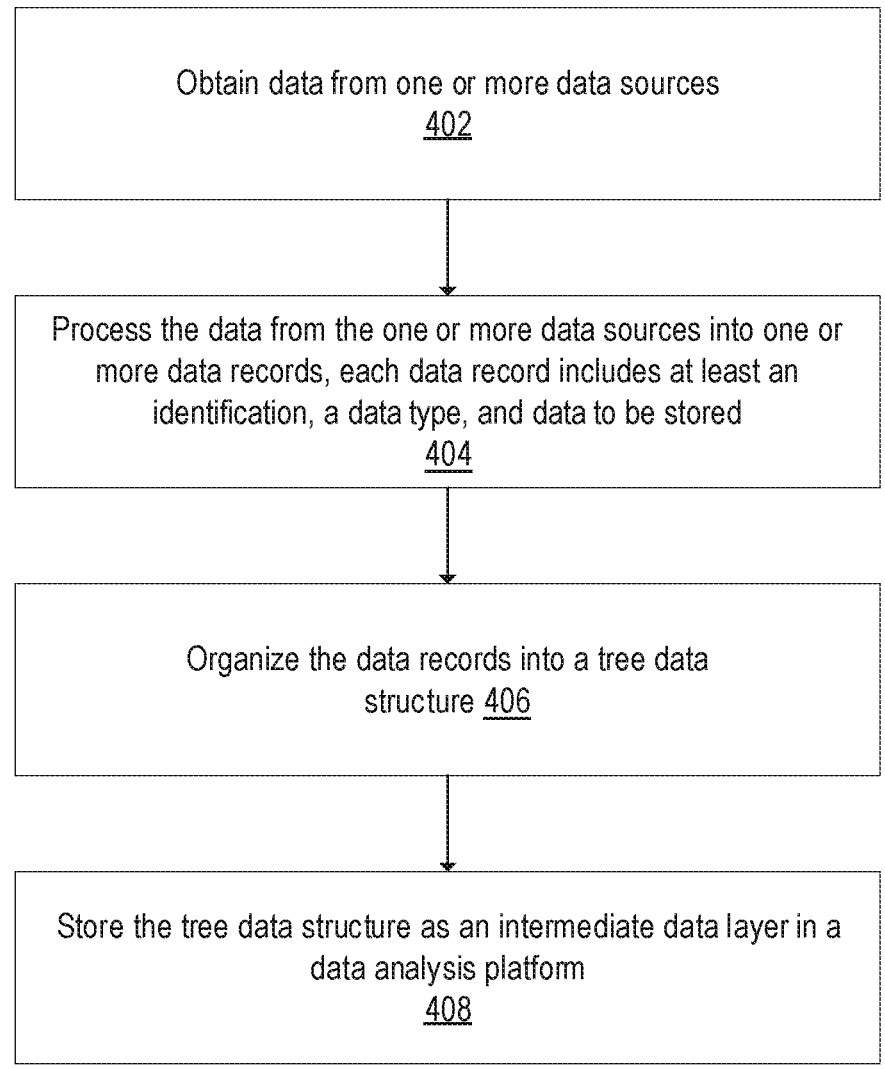
FIG. 4 illustrates a flowchart of an example method for storing data from a data source as an intermediate data layer, in accordance with various embodiments of the present disclosure.

FIG. 4 illustrates a flowchart of an example method 400 for storing data from a data source as an intermediate data layer, in accordance with various embodiments of the present disclosure. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

At block 402, data from one or more data sources can be obtained by a computing system. At block 404, the data from the one or more data sources can be processed into one or more data records. Each data record can include at least an identification, a data type, and data for be stored. At block 406, the data records can be organized into a tree data structure. At block 408, the tree data structure can be stored as an intermediate data layer in a data analysis platform.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
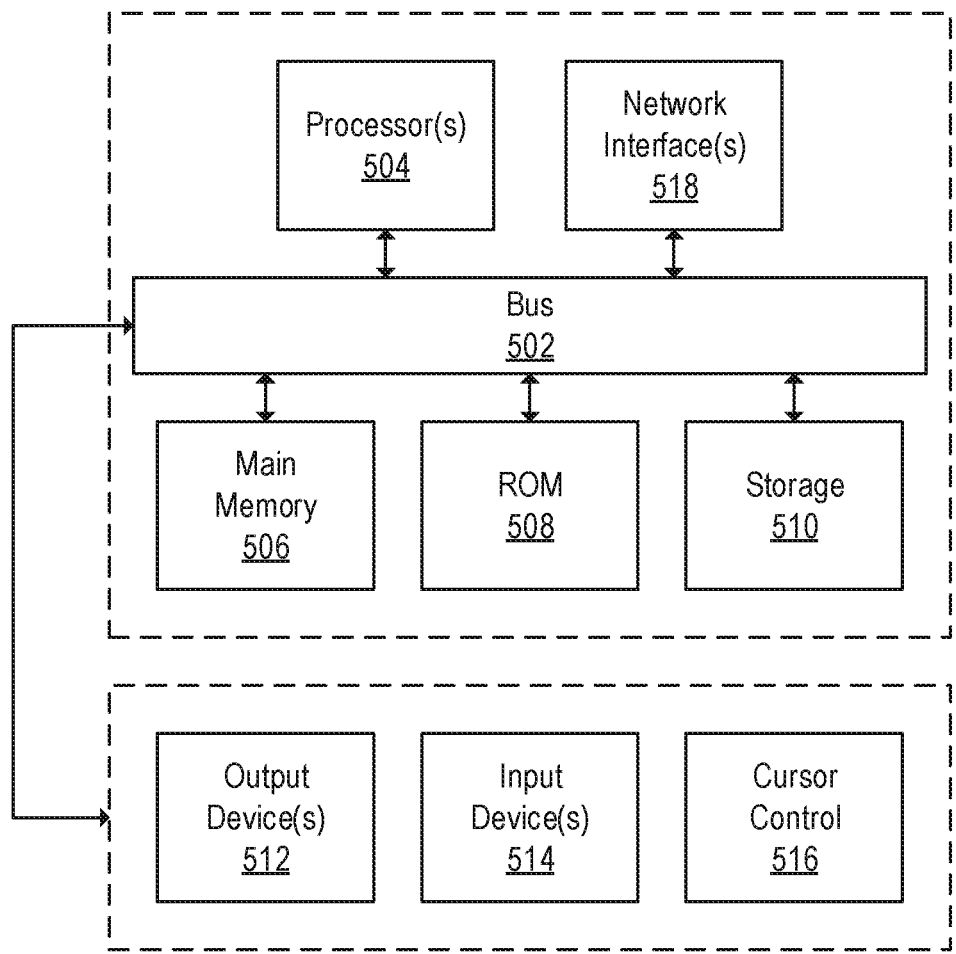
FIG. 5 illustrates a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method comprising:
   obtaining, by a computing system, data from one or more data sources;
   processing, by the computing system, the data from the one or more data sources into one or more data records, each data record including at least an identification, a data type, and data to be stored;
   organizing, by the computing system, the data records into a tree data structure;
   storing, by the computing system, the tree data structure as an intermediate data layer in a data analysis platform;
   generating, by the computing system, one or more data analysis objects for utilization in the data analysis platform based on data stored in the intermediate data layer;
   processing, by the computing system, the one or more data analysis objects in the data analysis platform; and determining, by the computing system, one or more relationships between the one or more data analysis objects.

2. The computer-implemented method of claim 1, wherein the data from the one or more data sources comprises content and metadata information of the one or more data sources, wherein the metadata information is associated with the content.

3. The computer-implemented method of claim 2, wherein the content comprises at least words associated with data entries of the one or more data sources.

4. The computer-implemented method of claim 2, wherein the metadata information includes at least one of a date a data entry was last edited, a number of edits to a data entry, or an URL address of a data entry.

5. The computer-implemented method of claim 1, further comprising:
receiving, by the computing system, a user indication to access provenance information associated the one or more data analysis objects; and
generating, by the computing system, a user interface, at runtime, to display at least the data from the one or more data sources alongside the one or more data analysis objects.

6. The computer-implemented method of claim 5, wherein generating the user interface to display at least the data from the one or more data sources comprises:
recreating, by the computing system, the content and the metadata information from data stored in the intermediate data layer;
customizing, by the computing system, the metadata information to be displayed on the user interface; and
displaying, by the computing system, the content and the customized metadata information on the user interface.

7. The computer-implemented method of claim 5, further comprising:
indicating, by the computing system, upon a user interaction, in the user interface, a correspondence between the data from the one or more data sources and a data analysis object of the one or more data analysis objects.

8. The computer-implemented method of claim 1, wherein the identification of each data record is generated based on a function.

9. The computer-implemented method of claim 8, wherein the function is implemented as a hash function plus a user provided value.

10. A computing system comprising:
at least one processor; and
a memory storing instructions that, when executed by the at least one processor, cause the computing system to perform:
obtaining data from one or more data sources;
processing the data from the one or more data sources into one or more data records, each data record including at least an identification, a data type, and data to be stored;
organizing the data records into a tree data structure;
storing the tree data structure as an intermediate data layer in a data analysis platform;
generating one or more data analysis objects for utilization in the data analysis platform based on data stored in the intermediate data layer;
processing the one or more data analysis objects in the data analysis platform; and
determining one or more relationships between the one or more data analysis objects.

11. The computing system of claim 10, wherein the instructions cause the computing system to further perform:
receiving a user indication to access provenance information associated the one or more data analysis objects; and
generating a user interface, at runtime, to display at least the data from the one or more data sources alongside the one or more data analysis objects.

12. The computing system of claim 11, wherein generating the user interface, at runtime, to display the data from the one or more data sources alongside the one or more data analysis objects comprises:
recreating the content and the metadata information from data stored in the intermediate data layer;
customizing the metadata information to be displayed on the user interface; and
displaying the content and the customized metadata information on the user interface.

13. The computing system of claim 11, wherein the instructions cause the computing system to further perform:
indicating, upon a user interaction, in the user interface, a correspondence between the data from the one or more data sources and a data analysis object of the one or more data analysis objects.

14. A non-transitory computer-readable storage medium including instructions that, when executed by at least one processor of a computing system, cause a computing system to perform a method comprising:
obtaining data from one or more data sources;
processing the data from the one more data sources into one or more data records, each data record including at least an identification, a data type, and data to be stored;
organizing the data records into a tree data structure; and
storing the tree data structure as an intermediate data layer in a data analysis platform;
generating one or more data analysis objects for utilization in the data analysis platform based on data stored in the intermediate data layer;
processing the one or more data analysis objects in the data analysis platform; and
determining one or more relationships between the one or more data analysis objects.

15. The non-transitory computer-readable storage medium of claim 14, wherein the instructions when executed cause the computing system to further perform:
receiving a user indication to access provenance information associated the one or more data analysis objects; and
generating a user interface, at runtime, to display at least the data from the one or more data sources alongside the one or more data analysis objects.

16. The non-transitory computer-readable storage medium of claim 15, wherein generating the user interface, at runtime, to display the data from the one or more data sources alongside the one or more data analysis objects comprises:
recreating the content and the metadata information from data stored in the intermediate data layer;
customizing the metadata information to be displayed on the user interface; and
displaying the content and the customized metadata information on the user interface.

17. The non-transitory computer-readable storage medium of claim 15, wherein the instructions when executed cause the computing system to further perform:
indicating, upon a user interaction, in the user interface, a correspondence between the data from the one or more data sources and a data analysis object of the one or more data analysis objects.

* * * * *